July 3, 1962  M. M. ZORGDRAGER ETAL  3,042,057
HIGH AND LOW PRESSURE CUT-OFF VALVE
Filed Sept. 4, 1959

*INVENTORS*
MAURRICE M. ZORGDRAGER
MARVIN R. JONES
BY
ATTORNEYS

United States Patent Office 3,042,057
Patented July 3, 1962

3,042,057
HIGH AND LOW PRESSURE CUT-OFF VALVE
Maurrice M. Zorgdrager, Houston, and Marvin R. Jones, Harris County, Tex., assignors to Cameron Iron Works, Inc., Houston, Tex., a corporation of Texas
Filed Sept. 4, 1959, Ser. No. 838,195
9 Claims. (Cl. 137—70)

This invention relates to line control apparatus, and more particularly to apparatus and systems for automatically interrupting flow in the line controlled in response to predetermined conditions within the line.

In the handling of high pressure fluids in pipe lines, it is desirable to automatically shut off the source of fluid during emergencies. An emergency is usually considered to exist when pressures are above or below a predetermined range. Examples of pipeline conditions which would take the pressures outside of a predetermined range include "freezing" due to the formation of hydrates in the line, and a break in the line. Where the pressure is reduced a substantial amount in the pipeline as across a pressure reducing choke, the line downstream from the point of reduction is not usually designed to handle the high pressure upstream of the reduction choke. Therefore, when "freezing" occurs in the lower pressure section of the line, it is very desirable to close off the line before the full upstream pressure is exerted on the line downstream from the reduction choke.

It is an object of this invention to provide a safety valve for a line which is controlled by a single control valve which effects closing of the safety valve when a control pressure such as downstream pressure exceeds or falls below a predetermined range.

Another object is to provide a safety valve for a line which is controlled by a single control valve which effects closing of the safety valve when the differential across a choke associated with the safety valve exceeds or falls below a predetermined range.

Another object is to provide a safety valve for a line which is controlled by a single control valve which effects closing of the safety valve when a control pressure such as downstream pressure exceeds or falls below a predetermined range of substantial width.

Another object is to provide a safety valve for a line of the type in which a pressure responsive member is pressurized with upstream pressure to close the valve and the line conducting upstream pressure to the pressure responsive member is controlled by a single valve which effects closing of the safety valve when a control pressure such as downsteram pressure exceeds or falls below a predetermined range.

Another object is to provide a safety valve for closing a line when downstream pressure exceeds or falls below a predetermined value in which all control conduits are interior of the valve body to minimize danger of malfunction of the valve.

Other objects, features and advantages of the invention will be apparent from the drawing, the specification and the claims.

In carrying out this invention a main line valve member is operated by a pressure responsive member. The pressure responsive member may close the main valve due to venting of pressure fluid from a surface or due to pressurizing of a surface. Both types of valve operators are well known. The pressure responsive member is activated by pressure fluid flowing through a conduit. A single control valve controls this conduit and maintains it closed while a control pressure, such as downstream pressure, is within a predetermined range. When the control pressure is outside this range the control valve opens, effecting closing of the main valve.

In the drawing wherein an illustrative embodiment of this invention is shown, and wherein like reference numerals indicate like parts:

Figure 1:
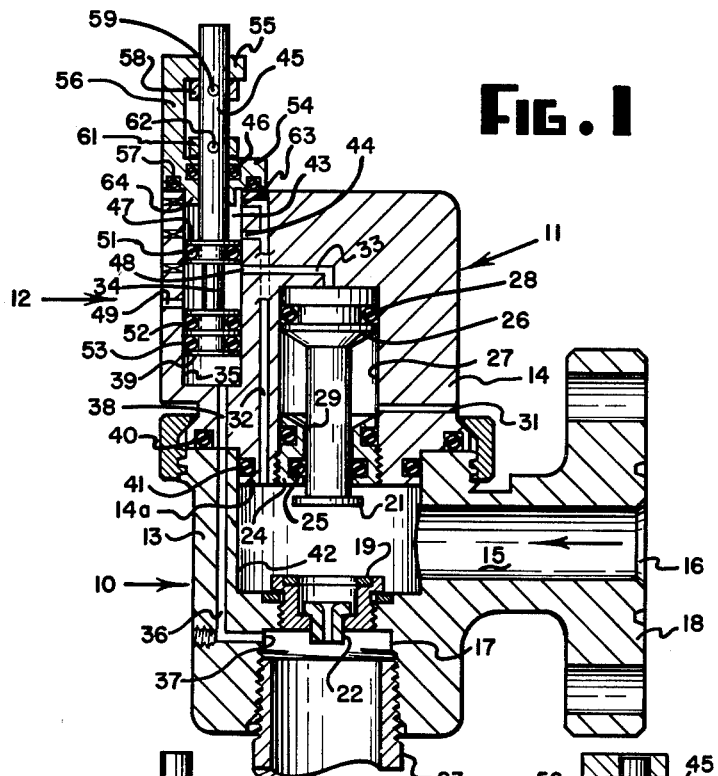
FIGURE 1 is a view in cross-section through a control valve constructed in accordance with this invention.

The control valve illustrated includes a main valve indicated generally at 10 which is closed by a motor operator or pressure responsive member indicated generally at 11, and a control valve indicated generally at 12. Upstream pressure maintains the main valve 10 in open condition until the control pressure which governs the action of the control valve 12 exceeds or falls below a predetermined value. When this occurs the motor operator 11 is pressurized with upstream pressure to close the main valve and shut off the line.

The main valve includes a body having two major portions 13 and 14. A flowway 15 extends through the body from the inlet 16 to the outlet 17 and conducts fluid through the valve. The flange 18 may be connected to the flow outlet of a Christmas tree, and the valve of this invention will provide a safety valve to protect the line downstream of the safety valve from excess pressure and will shut in the well upon a break occurring in the line downstream of the valve.

A valve seat 19 is provided in the flowway 15 and cooperates with valve member 21 to control flow through passageway 15.

When the valve is used to protect a downstream line a choke 22 is preferably provided in the passageway and downstream of the valve seat 19 and a pressure drop is taken at this point. Thus, in the form of valve illustrated, the pressure upstream of choke 22 will remain substantially constant. Upon an obstruction occurring in the downstream pipe, a portion of which is shown at 23, the downstream pressure in outlet 17 will increase. Upon a break occurring in the downstream line 23, the pressure in outlet 17 will decrease.

The main valve is carried in a bushing 24 secured in section 14 of the valve housing. A suitable seal 25 is provided therebetween. With this arrangement, upstream pressure is effective on the valve member, when open, over an area defined by seal 25, and this pressure urges the valve 21 to fully open position.

Connected to the main valve member 21 is a motor operator or pressure responsive member indicated generally at 11 for moving the main valve member 21 to closed position. This motor valve is provided by a pressure responsive member or piston 26 connected to the valve member 21 and slidable within bore 27 of housing 14. A suitable seal 28 is provided between the piston and cylinder. It will be noted that the cylinder 27 is of greater diameter than the bore 29 through bushing 24, and, therefore, upon pressurizing the piston 28 with upstream pressure, the valve member will be moved to closed position. To insure that any small amount of leakage past any of the seals will not prevent this operation and to prevent a hydraulic lock, a suitable vent opening 31 is provided in housing 14 to vent the cylinder 27 immediately above the bushing 24.

Upstream pressure is conducted to the pressure responsive member provided by piston 26 through a suitable conduit provided by conduit portions 32 and 33. Conduit portion 32 opens into the flowway 15 and conduit portion 33 opens into cylinder 27 on the side of piston 26 remote from seat 19. It is noted that the entire conduit for conducting upstream pressure to the pressure responsive member is contained within the body portion 14 and cannot be accidentally ruptured, as would be the case with an exterior conduit, to permit loss of pressure fluid to the atmosphere.

Flow of upstream pressure through the conduit portions 32 and 33 is controlled by a slide valve 12. The slide valve 12 includes a slide valve member 34 which is slidable within a bore 35 provided in body portion 14.

The slide valve member 34 has a surface exposed to a control pressure and the valve is so constructed that it will open to provide communication between conduit portions 32 and 33 when the control fluid pressure is above or below a predetermined range. As it is desired to close the valve only in the instance of a break in the downstream line or an obstruction in the downstream line, which would be evidenced by very wide differences in pressure, the range in which the slide valve 12 will remain closed should be substantial.

Preferably the control pressure which governs slide valve 12 is taken directly from the downstream line so that the main valve will be directly controlled by downstream conditions. It is preferred that this control pressure be conducted from the downstream line to the control valve 12 by an internal conduit which cannot be accidentally broken after the valve is installed and permit loss of well fluids to the atmosphere. In the form of valve illustrated this may be accomplished by providing a conduit 36 which extends from an opening 37 in the valve outlet 17, which is downstream from choke 22, to the juncture between the body parts 13 and 14. A similar conduit 38 is aligned with conduit 36 and extends to the slide valve cylinder 35 to conduct downstream pressure to the endwise face 39 of the slide valve 34. Suitable seals are provided for conducting pressure between conduits 36 and 37 by the O-rings 40 and 41. O-ring 40 seals between the abutting surfaces of body portions 13 and 14 at a point toward the exterior of the body from the conduits 36 and 38. Interiorly of these conduits a boss 14a on the body portion 14 extends into the bore 42 which provides a portion of passageway 15. Seal 41 seals between this boss and bore to both confine pressure fluid within the flowway 15 and to isolate control pressure fluid from conduit 36 from the upstream pressure.

Means are provided for urging the slide valve member 34 in a direction opposed to the force exerted by control pressure on the endwise face 39 of the slide valve member. While this force might be provided by any desired resilient means acting on the slide valve member in a direction opposed to the force of downstream pressure, it is preferred to provide a chamber 43 which is exposed to upstream pressure for urging the slide valve member 34 against the force of downstream pressure. This may be accomplished by positioning the opening from the passageway 32 at approximately the point 44 so that when the slide valve member is in conduit-closing position, as shown in FIGURE 1, the chamber 43 is pressurized with upstream pressure. With this arrangement, the resilient means provided by upstream pressure in chamber 43 opposes the action of control pressure on the pressure-responsive surface 39 of slide valve 34. If the control pressure exceeds a predetermined range, the resultant force on the valve member urges the slide valve 34 against the force of pressure in chamber 43. If the control pressure reduces below this predetermined range, the pressure within chamber 43 results in a greater force on the valve than the control pressure and tends to move the valve member against the force of downstream pressure.

The resultant forces of control fluid pressure and upstream pressure in chamber 43 on the valve member may be approximately equalized in any desired manner as by providing a fairly large stem 45 on the valve member which extends to the exterior of the body through a sliding seal provided by O-ring 46. Thus, the pressure responsive annulus 47 on the slide valve member is of much less area than the surface 39 on the valve member, and the force of upstream pressure on the small area 47 may approximate the force of downstream pressure on the large area 39.

In order to assure that the main valve 21 remains open while the control pressure is within the predetermined range, the conduit 33 leading to the motor piston 26 opens into the slide valve cylinder 35 at 48 and communicates with a vent 49 which vents the cylinder to atmosphere. Suitable seals 51 and 52 are provided on the slide valve 34 and straddle the vent 49 and outlet 48 of conduit 33 when the control pressure is within the predetermined range. The seal 51 also interrupts communication between conduits 32 and 33 to confine upstream pressure in chamber 43. A third seal 53 is provided on the slide valve closely adjacent seal 52 and defines the pressure responsive area of the slide valve piston 34 which is subject to control pressure.

Figure 3:
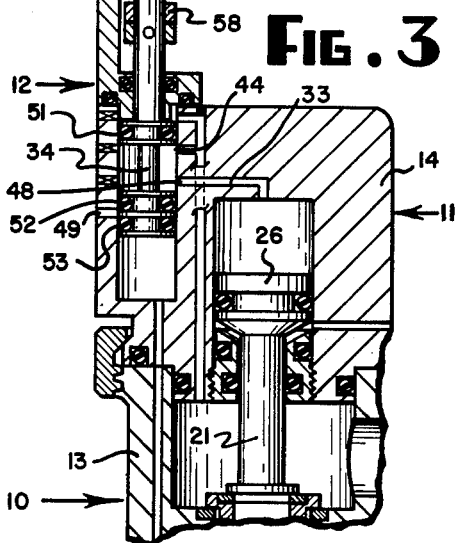
Figure 2:
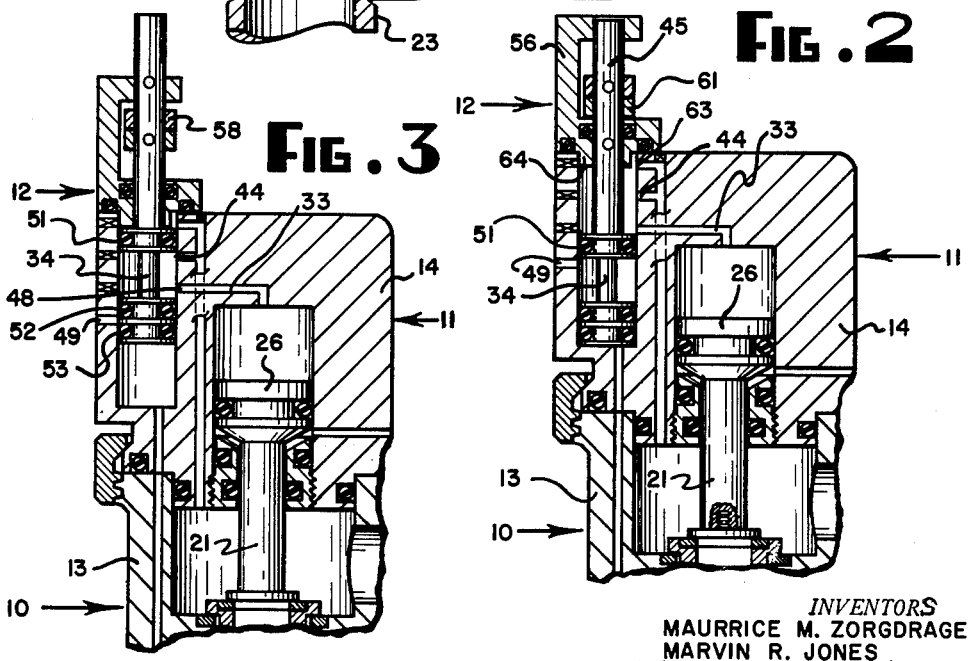
FIGURE 2 is a view similar to FIGURE 1 showing the valve closed due to a decrease in control pressure below a predetermined range; and, FIGURE 3 is a view similar to FIGURE 1 showing the valve closed due to an increase in control pressure above a predetermined range.

The control valve remains in the closed position illustrated in FIGURE 1 during fluctuation of the control pressure over a broad range due to the provision of means resisting movement of the control valve in either direction until the control pressure exceeds or falls below this predetermined range. Any suitable means which will prevent movement of the slide valve member until the control pressure is without this pressure range may be employed. An exceedingly simple means for accomplishing this objective is shown in the illustrated embodiment and is provided by shear means for resisting movement of the slide valve member in opposite directions. Abutments 54 and 55 are provided by a U-shaped member 56 which is secured to the body portion 14 by means not shown. Preferably this U-shaped member 56 closes the end of cylinder 35 and a suitable seal is provided for this closure by O-ring 57. The enlarged valve stem 45 of valve 34 extends through the U-shaped member 56. A collar 58 is pinned to the steam 45 by a shear pin 59 and resists upward movement of the slide valve 34 until the control pressure exceeds a predetermined range at which time the pin 59 shears and permits the valve stem to move upwardly as shown in FIGURE 3. In like manner, a collar 61 is pinned to the valve stem 45 by shear pin 62 and bears against abutment 54 and resists downward movement of the slide valve 34 due to pressure within chamber 43. When the control pressure increases or falls below a predetermined range, the unbalance force condition on slide valve member 34 is such that pins 59 or 62 will shear permitting the valve member to move to one of two open positions. Movement of the valve member either upwardly or downwardly to the FIGURES 2 and 3 positions, respectively, opens the slide valve member and permits upstream pressure to pass through conduits 32 and 33 to pressurize piston 26 and close the main valve.

When the control pressure reduces below a predetermined value the unbalance force condition on the slide valve causes the pin 62 to shear. The valve moves down to the position shown in FIGURE 2. The seal 51 moves past the opening 48 of passageway 33 to place the openings of the conduits 32 and 33 into cylinder 35 in communication with each other. Downward movement of the valve is stopped by the valve abutting the bottom of the cylinder 35 with seal 51 positioned between conduit 33 and vent 49 and there is no loss of pressure fluid due to the operation of the control valve.

When control fluid pressure increases beyond the predetermined value so that the force conditions on the slide valve 34 are such as to shear pin 59, the slide valve 34 moves to the FIGURE 3 position. With the slide valve in its full uppermost position, the seals 51 and 52 straddle the openings of passageways 32 and 33 into cylinder 35 establishing communication therebetween so that upstream pressure may flow to the piston 26 and close the main valve. In this position, the seals 52 and 53 straddle the vent 49 so that neither upstream nor downstream pressure is vented to atmosphere upon closing of the valve.

It will be noted that conduit 32 opens into cylinder 35 at point 63 above opening 44. A boss 64 on member 56 projects into cylinder 35 and stops movement of piston 34 before this opening is covered by seal 51. Therefore, fluid cannot be trapped above the piston and provide a fluid lock.

Upon restoring the downstream line conditions to normal operation so that the downstream pressure conditions are returned to normal, the slide valve member may be returned to its FIGURE 1 position and a new shear pin may be inserted in place of the sheared pin to again condition the control valve apparatus for automatic operation.

While control is effected by placing the control valve across conduit 32—33, it will be obvious to those skilled in the art that this conduit might be open and also communicate with cylinder 27 immediately below seal 28 through a bleed, and the control valve used to control vent passage 31 in the same manner as herein explained. Of course, vent passage 49 would be omitted when the venting type of control is employed.

In many liquid petroleum wells the pressure at the well head will vary considerably. When this invention is used with such wells, it will be appreciated that the control valve will be operated by a differential which is effected by changes in well pressure. Other wells, including most gas wells, maintain a substantially constant well head pressure over long periods of time and the control valve will be responsive to downstream pressure changes alone. In either type of well an independent resilient means such as a spring may be substituted for upstream pressure on the control valve, and the control valve will be operated solely by changes in control fluid pressure.

The foregoing disclosure and description of the invention is illustrative and explanatory thereof and various changes in the size, shape and materials, as well as in the details of the illustrated construction, may be made within the scope of the appended claims without departing from the spirit of the invention.

What we claim is:

1. A pressure responsive valve comprising, a body having a flowway therethrough, a valve seat in the flowway, a main valve member cooperable with the seat to control flow through the flowway, a cylinder closed at one end, a piston in the cylinder connected to the main valve member, a conduit leading to a chamber formed in the closed end of the cylinder by the piston, said conduit supplying fluid to actuate the piston and main valve member to valve closing position, a slide valve including a slide valve member connected in and controlling said conduit, at least one pressure responsive surface on said slide valve member exposed to a control pressure, means urging the slide valve member against control pressure on said one surface, and means maintaining the slide valve member in an intermediate closed position while said control pressure is within a predetermined range, said maintaining means yielding and permitting the slide valve member to move to open position due to an unbalance in the forces resulting from the urging means and control pressure acting on the slide valve member when the control pressure is above or below a predetermined range.

2. A pressure responsive valve comprising, a body having a flowway therethrough, a valve seat in the flowway, a main valve member cooperable with the seat to control flow through the flowway, a chamber, a pressure responsive member in the chamber and connected to the main valve member and when pressurized with upstream pressure closing the main valve, a conduit conducting fluid pressure from the flowway upstream of the seat to said chamber to be effective on the pressure responsive member, a slide valve including a slide valve member connected in and controlling said conduit, at least one pressure responsive surface on said slide valve member exposed to a control pressure, means urging the slide valve member against control pressure on said one surface, and means maintaining the slide valve member in an intermediate closed position while said control pressure is within a predetermined range, said maintaining means yielding and permitting the slide valve member to move to open position due to an unbalance in the forces resulting from the urging means and control pressure acting on the slide valve member when the control pressure is above or below a predetermined range.

3. A pressure responsive valve comprising, a body having a flowway therethrough, a valve seat in the flowway, a main valve member cooperable with the seat to control flow through the flowway, a chamber, a pressure responsive member in the chamber and connected to the main valve member and when pressurized with upstream pressure closing the main valve, a conduit conducting pressure from the flowway upstream of the seat to the chamber to be effective on the pressure responsive member, a slide valve including a slide valve member connected in and controlling said conduit, at least one pressure responsive surface on said slide valve member exposed to a control pressure, means urging the slide valve member against control pressure on said one surface, means preventing movement of the slide valve member from an intermediate closed position to a first position to open said conduit until the control pressure has dropped to a value below a predetermined range, said movement preventing means yielding to permit movement of the slide valve to open position by said urging means when control pressure drops to a value below said predetermined range, and means preventing movement of the slide valve member from said intermediate closed position to a second open position to open said conduit until the control pressure has increased to a value above a predetermined range, said last mentioned means yielding to permit movement of the slide valve to said second open position by said control pressure when said control pressure exceeds a predetermined range.

4. A pressure responsive valve comprising, a body having a flowway therethrough, a valve seat in the flowway, a main valve member cooperable with the seat to control flow through the flowway, a chamber, a pressure responsive member in the chamber and connected to the main valve member and when pressurized with upstream pressure closing the main valve, a conduit conducting pressure from the flowway upstream of the seat to the chamber to be effective on the pressure responsive member, a slide valve including a slide valve member connected in and controlling said conduit, at least one pressure responsive surface on said slide valve member exposed to a control pressure, means urging the slide valve member against control pressure on said one surface, and first and second shear pin means between the body and slide valve member holding said slide valve member in an intermediate closed position, said first shear pin means preventing reciprocation of the slide valve member in one direction and said second shear pin means preventing reciprocation of the slide valve member in the opposite direction, said first and second shear pin means, respectively, shearing and releasing the slide valve member for movement in response to the control pressure exceeding or falling below a predetermined range.

5. A pressure responsive valve comprising, a body having a flowway therethrough, a choke in the flowway, a valve seat in the flowway, a valve member cooperable with the seat to control flow through the flowway, a first cylinder having a closed end in the body, a piston in the first cylinder connected to the valve member and moving the valve toward closed position with movement of the piston away from the closed end of the cylinder to control the position of the valve member, a second cylinder in the body, a slide valve member having spaced sliding seal means thereon reciprocal in the second cylinder, first and second shear pin means between the body and slide valve member, said first shear pin means preventing movement of the slide valve member in one direction and said second shear pin means preventing movement of the slide valve member in the other direction, first conduit means within the body interconnecting the flowway upstream of said choke with said second cylinder adjacent one end thereof, second conduit means within the body interconnecting the flowway downstream of said choke with the other end of said second cylinder whereby the differential across said choke is effective on said spaced seal means on the slide valve, and third conduit means within the body interconnecting said second cylinder at a point intermediate said spaced seals on the slide valve member with said first cylinder on the side of said piston remote from said valve member, said first and second shear pin means respectively shearing and releasing the slide valve for movement in response to downstream pressure exceeding or falling below a predetermined range.

6. A valve comprising, a slide valve body having a flowway therethrough, a slide valve member controlling said flowway, at least one pressure responsive surface on said slide valve member exposed to a control pressure, means urging the slide valve member against control pressure on said one surface, and means maintaining the slide valve member in an intermediate closed position while said control pressure is within a predetermined range, said maintaining means yielding and permitting the slide valve member to move to open position due to an unbalance in the forces resulting from the urging means and control pressure acting on the slide valve member when the control pressure is above or below a predetermined range.

7. A valve comprising, a slide valve body having a flowway therethrough, a slide valve member controlling said flowway, at least one pressure responsive surface on said slide valve member exposed to a control pressure, means urging the slide valve member against control pressure on said one surface, and two means respectively preventing movement of the slide valve member in opposite directions from an intermediate closed position while the control pressure is within a predetermined range, one of said two means yielding and permitting the slide valve member to move to open position due to an increase in control pressure above said predetermined range, the other of said two means yielding and permitting the slide valve member to move to a second open position due to a decrease in control pressure below said predetermined range.

8. A valve comprising, a slide valve body having a flowway therethrough, a slide valve member controlling flow of fluid through said flowway, at least one pressure responsive surface on said slide valve member exposed to a control pressure, means urging the slide valve member against control pressure on said one surface, means preventing movement of the slide valve member to a first position to open said conduit until the differential in forces exerted by said urging means and said control pressure has exceeded a value above a predetermined range, said last mentioned movement preventing means yielding and permitting movement of the slide valve member to open position by said urging means when said differential exceeds said predetermined range, and means preventing movement of the slide valve member to a second open position to open said conduit until the differential of the forces exerted by said control pressure and said urging means have decreased to a value below said predetermined range and ineffective to prevent movement of the slide valve to said second open position by said control pressure when said differential is less than said predetermined range.

9. A pressure responsive valve comprising, a body having a flowway therethrough, a valve seat in the flowway, a main valve member cooperable with the seat to control flow through the flowway, a cylinder having a closed end, a piston in the cylinder connected to the main valve, a conduit leading to the cylinder, a slide valve including a slide valve member connected in and controlling said conduit, at least one pressure responsive surface on said slide valve member exposed to a control pressure, means urging the slide valve member against control pressure on said one surface, means preventing movement of the slide valve member from a closed position to a first position to open said conduit until the differential in forces exerted by said urging means and said control pressure has exceeded a value above a predetermined range, said movement preventing means yielding and permitting movement of the slide valve member to open position by said urging means when said differential exceeds said predetermined range, and means preventing movement of the slide valve member from said closed position to a second open position to open said conduit until the differential of the forces exerted by said control pressure and said urging means have decreased to a value below said predetermined range, said last mentioned movement preventing means yielding and permitting movement of the slide valve to said second open position by said control pressure when said differential is less than said predetermined range.

References Cited in the file of this patent

UNITED STATES PATENTS

| | | |
|---|---|---|
| 1,951,897 | Binkley | Mar. 20, 1934 |
| 2,152,084 | Paine | Mar. 28, 1939 |
| 2,327,055 | McMahon | Aug. 17, 1943 |
| 2,613,683 | Baird | Oct. 14, 1952 |
| 2,759,488 | Garrett | Aug. 21, 1956 |
| 2,796,885 | Garrett | June 25, 1957 |
| 2,812,776 | Lofftus | Nov. 12, 1957 |